Sept. 8, 1964 H. A. KEHL 3,147,896
SAFETY BELT BILLFOLD
Filed June 30, 1960 2 Sheets-Sheet 1
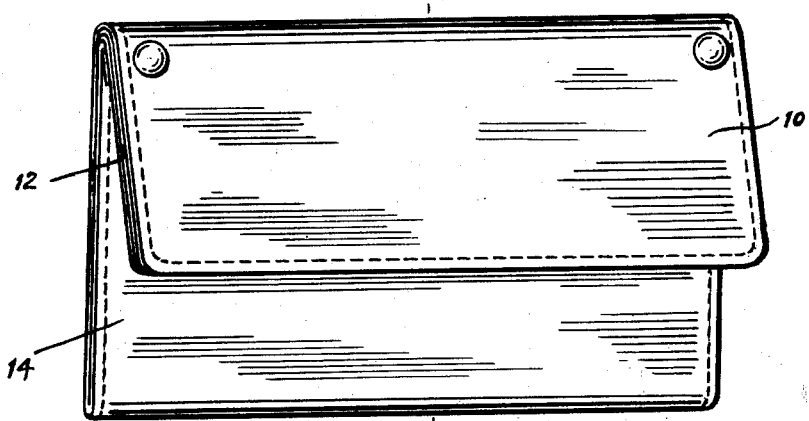
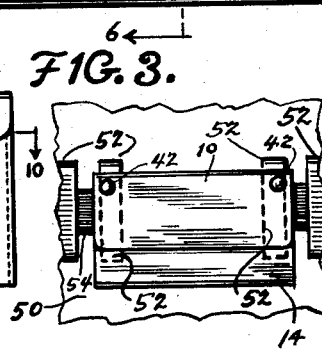
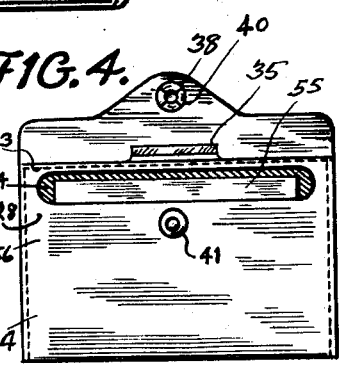
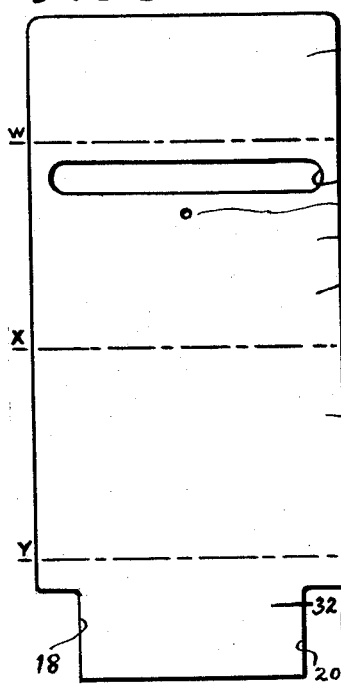
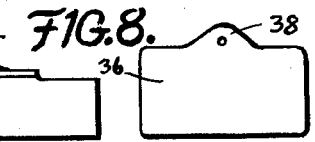
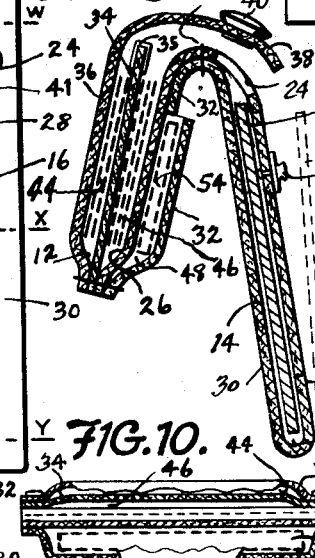
INVENTOR.
HOWARD A. KEHL
BY Whittemore, Hulbert
& Belknap
ATTORNEYS Sept. 8, 1964     H. A. KEHL     3,147,896
SAFETY BELT BILLFOLD
Filed June 30, 1960     2 Sheets-Sheet 2
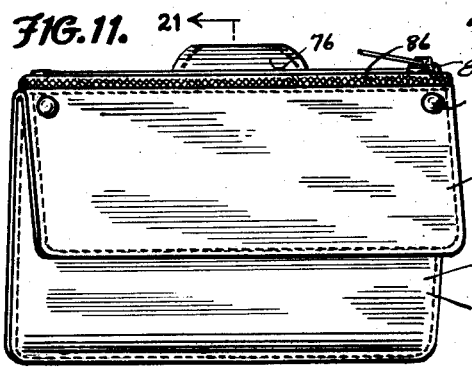
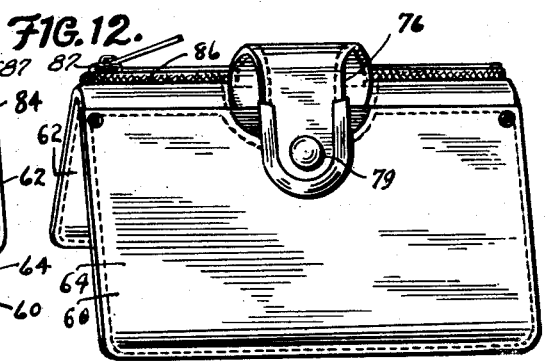
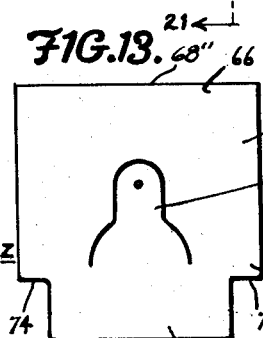
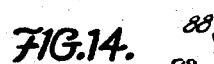
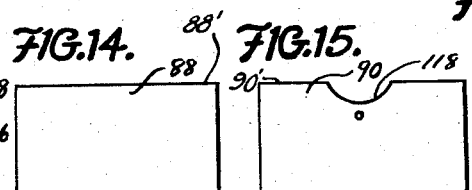
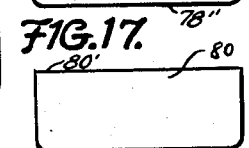
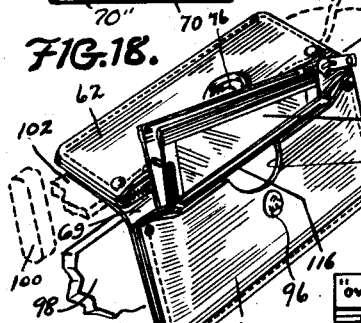
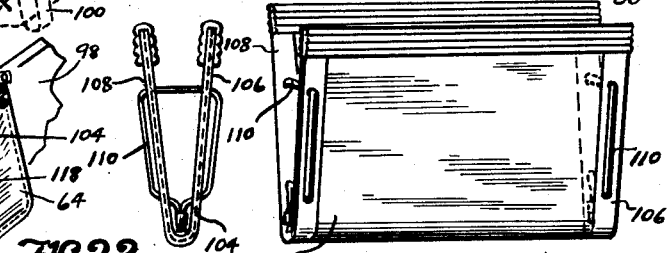
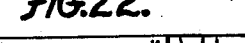
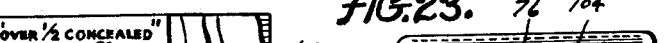
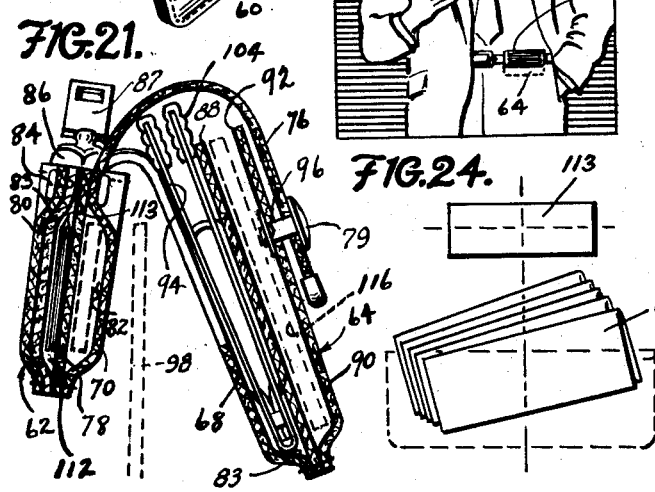
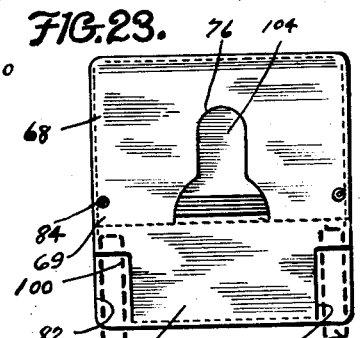
INVENTOR.
HOWARD A. KEHL
BY Whitmore, Hulbert
& Belknap
ATTORNEYS

3,147,896
SAFETY BELT BILLFOLD
Howard A. Kehl, 12063 Roselawn, Detroit 4, Mich.
Filed June 30, 1960, Ser. No. 40,066
4 Claims. (Cl. 224—26)

The present invention relates to billfolds and more particularly to a safely belt billfold for men which is adapted to be placed in a position straddling the trousers' top so as to horizontally support the billfold. The billfold may be worn so that approximately one-half of the billfold is concealed behind the wall of the trousers. The belt fastened to the billfold secures the billfold tightly against the body of the user at the waistline. At the option of the user, the billfold may be worn in its entirety in front of the trousers exposed to view and supported only by the belt.

This invention provides a breakthrough in the construction of a wallet or billfold since it is safely secured on the belt and is therefore secured against pickpockets or accidental loss. In conventional billfolds, the contents are removed after first removing the billfold in its entirety from a pocket in a coat or in the trousers. This procedure results not only in wasted time and effort, but also in wear and tear on the trousers or coat as well as on the billfold itself.

In both embodiments of this invention, the billfold is adapted to be carried at waist level which offers maximum ease of access with respect to the clothing, and above all, a faster and easier method is provided for handling currency however folded or carried. A unique system for separately housing and dispensing one dollar bills is provided whereby this particular denomination can be flipped out in rapid succession due to initially stacking the bills side by side. In one embodiment larger bills are carried by themselves in a specially devised holder to permit manual projection thereof into or from the compartment therefor the compartment is lined so as to reduce frictional resistance to a minimum. A card folder or inert for a plurality of cards can be stored, if the user wishes, in a compartment behind the trousers' top edge or trousers wall.

A simpler embodiment of the invention, as shown on sheet one of the drawings, eliminates the aforementioned holder for large bills together with a zipper closure. It provides an exposed section, worn in front of the belt, housing two compartments separated by a barrier—one for one dollar bills only and the other for larger bills, with the bills cross folded to one-quarter size and stacked side by side. Snap fastener closure means is provided instead of a zipper and the wall construction of the billfold is simplified.

Both embodiments of the invention comprise a pair of sections which are integrally connected by a yieldable strip that offers flexible connecting means about which the sections are movable with reference to each other. The sections of the billfold, when properly supported by both the trousers' top edge and belt or by the belt alone, when worn entirely in the front exposed to view, are adapted to lie in planes which are substantially parallel. Thus, the billfold provides a two-way method for usage: worn entirely exposed and belt supported; or, on the other hand, supported by the trousers' top edge with more than one-half of its bulk hidden behind the trousers wall, with the belt serving as complementary securing means for keeping the outer compartment of the billfold flatly compressed against the body of the user at the waistline.

It is apparent that such a construction no longer requires the billfold, as a whole, to be removed from and reinserted into a clothes pocket as conventional billfolds require. The problem is materially reduced, simplified and quickened by limiting such action to only two elements, viz., the specially devised holder for large bills and the card holder, while at the same time access to one dollar bills is expanded into as automatic a system as is perhaps humanly possible.

It is an object of this invention to provide an improved billfold which is more in keeping with the increased tempo of the times and demand for safety of the contents in the billfold.

It is another object of the invention to provide a simplified, lightweight, low-cost billfold of the aforementioned type ideally suited for sportswear, and which may be worn as an alternative-style wallet by men who require that their valuables be safeguarded while engaged in outside sports.

Another object of the invention is to provide a billfold having dual belt inserts, whereby a belt is projected longitudinally through the billfold, which permit men of all girths regardless of variable spacing between trousers' straps to use the billfold, thereby allowing for lateral movement of the billfold when mounted and for placing the billfold over any trousers' straps which might be necessary.

Another object of the invention is to provide a substantially V-shaped holder for currency which is single folded, and which is peculiarly adapted for projection into the special compartment in the billfold. The holder provides between its side walls resilient and flexible connecting means which permit the holder to open quickly when removed by hand from the billfold, while also preventing the folded currency from falling sidewise out of the holder.

Other objects and features of the invention will become apparent as the description proceeds, especially when taken in conjunction with the accompanying drawings, illustrating two preferred embodiments of the invention, wherein:

FIGURE 1 is a front perspective view of one embodiment of the safety belt billfold.

FIGURE 2 is a rear elevational view.

FIGURE 3 is a front elevational view of the billfold mounted on a belt and entirely exposed to view when worn.

FIGURE 4 is a rear elevational view with the flap of the billfold in an open position so as to expose part of the interior of one of the compartments.

FIGURE 5 is a layout view of a piece of material which is adapted to be folded to form the main part of the billfold.

FIGURE 6 is a sectional view taken on line 6—6 of FIGURE 1.

FIGURE 7 is an elevational view of a partition.

FIGURE 8 is an elevational view of a partition with a flap.

FIGURE 9 is a view showing the manner in which the belt is inserted through the cut-back belt insert of the billfold.

FIGURE 10 is a sectional view taken on line 10—10 of FIGURE 2.

FIGURE 11 is a perspective view of another embodiment of the present invention showing, in particular, the front portion of the billfold.

FIGURE 12 is a perspective view showing, in particular, the back portion of the billfold.

FIGURES 13–17 are the individual portions which are utilized to form the novel billfold construction shown in FIGURES 11 and 12.

FIGURE 18 is a perspective view of the billfold when being applied to the supporting trousers' top edge.

FIGURE 19 is an end view of the central holder shown in FIGURE 20.

FIGURE 20 is a perspective view of the central holder.

FIGURE 21 is a sectional view taken on line 21—21 of FIGURE 11.

FIGURE 22 shows the billfold applied to a man's belt with over one-half of the billfold concealed behind the trousers' top as is indicated by the dotted line.

FIGURE 23 is a plan view of the billfold showing the trousers' straps as being covered by end portions of the billfold.

FIGURE 24 shows a way in which the money is folded and inserted into a compartment of the billfold.

The safety belt billfold shown on sheet one of the drawings is designated by the numeral 10 and includes a pair of sections 12 and 14 which are integrally connected to form a billfold construction having a substantially inverted U-shape cross section as is best illustrated in FIGURE 6.

Initially, a piece of soft and pliable material 16, such as leather, as shown in FIGURE 5, is formed. The piece of material 16 has cut-out portions 18 and 20 at one end thereof. An elongated slot 24 is provided in the material near the other end thereof. The material 16 is adapted to be folded along the W, X and Y axes which are represented by dotted lines in FIGURE 5. When folded, the piece of material 16 forms part of the billfold housing. The axes divide the material into wall portions 26, 28, 30 and 32. Initially, the piece of material 16 is folded on the axis X—X so that wall portions 26 and 28 lie adjacent to wall portions 32 and 30 respectively.

A partition 34 having a metal tab 35 thereon is positioned adjacent to the wall portion 26. An outside wall 36 having a flap 38 thereon is placed adjacent to the partition 34. The lower edges of wall 36, partition 34 and wall portions 26 and 32 are sewed together in a conventional manner as indicated in FIGURE 6. The corresponding side edges are also sewed as is shown in the various figures. The billfold 10 is also stitched, as indicated by numeral 13, along the complementary axes W—W and Y—Y so as to permit the two sections 12 and 14 to be folded about the axes into a substantially U-shape construction, said stitching 13 being shown in FIGURES 4 and 6.

The flap 38 has a snap 40 thereon which is adapted to engage a complementary snap portion 41 provided on the wall portion 28 adjacent to the slot 24. A pair of rivets 42 is provided to reinforce the sewing along the edges. The partition 34 divides section 12 into a pair of compartments 44 and 46. The wall portion 32 defines with the complementary portion 26 an opening or slot 48 through which a belt 54 may be inserted.

FIGURE 3 shows part of a man's trousers represented by the numeral 50. The trousers 50 has around its waist spaced straps 52. The billfold 10 is adapted to fit all trousers' girths including those designed for persons with slender, medium or heavy waistlines. The billfold 10 may be worn with any size waistline regardless of the variable spacing between the straps. The billfold 10 can be worn so that it is located between the straps or overlaps the straps as shown in FIGURE 3. Either arrangement allows desired lateral movement for adjusting the billfold either way over one strap or the other, or both, if desired, when worn on the belt.

FIGURES 3, 6 and 9 represent the backside belt insert or opening 48. The insert 48 covers a minimum span of 3½ inches between straps which is the minimum size required for men with a slender girth or waistline. When worn by a man of slender girth, as in FIGURE 3, the user may laterally shift the billfold and eliminate any necessity for a rigid wearing location between the belt buckle and the farthest strap located at the hip. This permits the billfold 10 to be used at any desired and comfortable position between these extreme points; if right handed, on the right side of the belt buckle, and if left handed, on the left side of the belt buckle.

FIGURE 3 shows the billfold being worn entirely in front of the trousers. FIGURE 6 shows the section 14 being located in front of the trousers wall 50 with the belt 54 extending through the belt insert 48. FIGURE 4 shows that slot 24 is of such a size to permit a card or money holder 55 or the like to be inserted into the compartment 56 defined by the wall portions 28 and 30. FIGURES 4 and 6 show the card holder 55 in the compartment 56.

Cards, money, important papers or the like may be used in compartments 44 and 46.

The other sheet of drawings shows another embodiment of the billfold as represented by the numeral 60. The billfold 60 is made from a plurality of pieces of material such as leather, as shown in FIGURES 13-17. The billfold 60 includes a plurality of integrally connected relatively movable sections 62 and 64. Each section is elongated and is provided with an outer wall, an inner wall, and an intermediate wall. The walls of each section are of substantially rectangular configuration and of substantially the same size. Each wall has inner and outer longitudinally extending edges and a pair of end edges.

The billfold 60 includes a piece or layer of material 66 which is common to both of the sections 62 and 64. The layer of material 66 forms the outer walls 68 and 70 for sections 64 and 62, respectively. The material 66 also includes an integral elongated flexible relatively narrow connecting strip or portion 69 through which the Z—Z axis extends. The connecting strip 69 is located between and arranged parallel to the inner longitudinally extending edges of the back walls 68 and 70. The sections 62 and 64 are relatively movable with respect to each other about the connecting strip 69.

Section 62 includes an intermediate wall 78 and a front wall 80. The inner longitudinally extending edge 78' of the intermediate wall 78 is stitched or sewed to the corresponding inner longitudinally extending edge on the outer wall 70. The outer edge 80" of the front wall 80, outer edge 78" of the intermediate wall 78 and the outer edge 70" of the outer wall 70 are also stitched or sewed together. In addition, the end edges of the front and intermediate walls 80 and 78 of section 62 are also stitched or sewed together. The end edges of the outer wall 70 are relieved or notched at 72 and 74 and cooperate with the corresponding intermediate wall 78 to define openings 82 to permit a belt to be inserted lengthwise through the openings between the intermediate and outer walls 78 and 70 thereof. A centrally located closure flap 76 is struck out of the connecting strip 69 and the outer wall 68 and is used for a purpose to be subsequently described.

Rivets 84 are provided at the ends of the upper row of stitching to reinforce the stitching or sewing as illustrated in FIGURE 11. Closure means 86 comprising a pair of rows of intermeshing slide fastener teeth are attached or connected to the inner longitudinally extending edges 78' and 80' of the intermediate and inner walls 78 and 80 respectively. The closure means 86 includes a conventional slide 87 for operating the slide fastener teeth in the conventional manner.

The other section 64 which is larger than section 62 also includes an intermediate wall 88 and a front wall 90. The intermediate wall 88 is interposed between the back wall 68 and the front wall 90. The end edges and the outer longitudinally extending edges 68", 88" and 90" of the outer wall 68, intermediate wall 88 and front wall 90 respectively of section 64 are stitched or sewed together in a conventional manner. The inner edges of the three walls of section 64 are not fastened together. With such a construction the intermediate wall 88 divides section 64 into a pair of compartments 92 and 94.

The closure strap 76 and the front wall 90 are provided with fastening means. Strap 76 carries a snap 79 which is adapted to engage a complementary snap portion 96 provided on the front wall 90. When the strap 76 is in a fastened position the compartments 92 and 94 are closed.

A liner 83, as an example, made from plastic, is provided on the interior of each compartment so as to provide a durable sweat shield or lining. It has been found that a very thin sheet of polyethylene may be used so as as protect the leather material from excessive wear due to frequent handling.

The billfold is adapted to be worn so that the section 64 is hidden from view. As shown in FIGURE 18, the trousers 98 has a plurality of straps 100 which are circumferentially spaced around the top of the trousers. The billfold 60 is attached to the belt 102 in between the straps 100 with section 64 of the billfold adapted to be supported by the trousers' top edge and to lie in close proximity to the inner surface of the trousers 98. The other section 62 is exposed to normal view and lies in close proximity to the outer wall of the trousers.

When section 14 of billfold 10 or section 64 of billfold 60 is carried on the inside of the trousers, a unique and novel arrangement is provided. Each section defines a compartment which is hidden from view behind the trousers' top. The billfold and, in particular, the hidden compartment is properly designed to provide adequate wearing comfort. The sides and bottom portion of the billfold are tapered slightly. The sides are designed so that the hidden compartment is suitable for the contour of any waist.

Wearing the billfold in such a manner provides continuous comfort even in extremely warm weather. This is due in part to its three-dimensional design which requires the width of the billfold to be relatively thin as compared to its length which lies on the circumference of the waist.

A central holder 104 formed of sheet plastic is shown in FIGURES 19 and 20. The plastic material is of such a weight to be both stiff and pliant while at the same time containing resilient characteristics which urge the sides 106 and 108 of the holder 104 apart when the holder is removed from the compartment 94. The holder 104 has a V-shape cross section and has accordion-type stops 110 provided at the lateral edges of the sides 106 and 108 to limit the extension of the sides to approximately one-half inch.

As previously mentioned, it is particularly desirable to separate the one dollar bills from the larger bills. As is usually the case, the one dollar bills are used more frequently than the larger denominations; so therefore, it is advisable to separate the one dollar bills from the larger bills and to conveniently locate them in separate compartments in the billfold. Since the billfold is located at belt level, such an arrangement permits the bills to be removed rapidly and with a minimum of effort.

The central card holder 104 provides means for carrying the larger bill denominations and in effect provides a 2-way currency acceleration system. The bills or checks are folded in half and placed side by side in the holder 104. Approximately a dozen or so bills can be conveniently carried in the holder. The holder 104 is in turn inserted in the hidden compartment 94 which is carried behind the wall of the trousers 98. When it is required to utilize some of the larger denominations, all that is required is that the tab 76 be unfastened and the holder 104 removed from the hidden compartment 94. Due to the resiliency of the holder 104, the sides 106 and 108 move outwardly so that the fingers may be inserted to remove the requisite bills. This can be accomplished faster and more conveniently than using conventional billfolds.

FIGURE 21 shows section 62 which contains compartment 112 which is provided with a liner 83 which, as an example, may be made from a plastic material. The one dollar bills 113 are folded in quarters, as shown in FIGURE 24, and are placed side by side in compartment 112.

When a one dollar bill is required, all that is necessary is for the user to unfasten the zipper 86 so as to expose the compartment 112. It is then only necessary to reach inside the exposed zipper pocket and remove one, two or up to a dozen dollars in rapid succession. The user merely holds his thumb on the inserted stack of bills which are folded to quarter size or cross folded, enabling the bills to be removed individually and rapidly with the two fingers on the opposite hand. The use of the smooth plastic pocket liner 83 in the compartment permits the bills to slide freely either when the bills 113 are initially inserted in the compartment 112 or when removed from the compartment 112. The folding of the bills in the manner hereinbefore described can be accomplished with a minimum amount of effort.

A card folder 116, of the accordian type, is retained in the hidden compartment 92. The folder 116 is easy to remove due to the plastic liner 83 in the compartment 92. A lip 118 is provided in the front wall 90 in order to facilitate the removal of the folder 116.

Appropriate metal tabs or trim are provided on various free edges or surfaces of the billfold or holder to provide an ornate appearance and to protect the edges during continued use.

The safety belt billfold is characterized by its masculine appearance, plain design, lightweight construction and the manner in which a man can handle the billfold with respect to currency. In addition, the billfold provides adequate wearing comfort due to its three-dimensional design.

The wearing of the billfold in the manner described provides a safe arrangement against pickpockets and accidental loss thereof. There is usually no handling of the billfold in and out of trousers or coat pockets since the billfold is mounted on the belt at waist level for easier and faster handling. However, if a person does not use a belt on his trousers or for other reasons, the billfold may be placed in the pocket of a coat or trousers in a folded position with the sections parallel to one another or in other cases, the billfold could be placed in the pocket in a substantially flat position, with both sections lying in substantially the same plane.

The drawings and the foregoing specification constitute a description of safety belt billfold in such full, clear, concise and exact terms as to enable any person skilled in the art to practice the invention, the scope of which is indicated by the appended claims.

What I claim as my invention is:

1. A billfold made from a flexible pliant material comprising a pair of independently usable elongated sections, said sections each having an outer wall, an inner wall, and an intermediate wall, the walls of each section being of substantially rectangular configuration and of substantially the same size, said walls each having inner and outer longitudinally extending edges and a pair of end edges, said billfold having a layer of the material which is common to both of said sections, said layer of material forming the outer walls of said sections and including an integral elongated flexible relatively narrow connecting strip between said outer walls and which is arranged substantially parallel to the longitudinally extending edges of said walls and about which said sections are relatively movable, the inner edges of said outer walls being integrally connected to said connecting strip, said inner walls being superimposed over said outer walls on opposite sides of said connecting strip, said intermediate walls being interposed between said inner walls and said outer walls, the outer longitudinally extending edges and the end edges of said inner and intermediate walls of said one section being stitched to the outer longitudinally extending edge and end edges of the outer wall of said one section respectively, the intermediate wall of one of said sections forming a partition which divides said one section into a pair of compartments, the longitudinally extending edges of said intermediate wall of said other section being stitched to the longitudinally extending edges of the outer wall of said other section, the outer longitudinally extending edge of the inner wall of said other section and the end edges thereof being stitched to the corresponding edges of the intermediate wall of said other section, the inner and intermediate walls of said other section defining a compartment therebetween, a closure flap struck out of said connecting strip and a portion of the outer wall of said one section so as to provide an opening therein, said closure flap being integrally connected to the outer wall of said other section and centrally located between the end edges thereof and overlying the inner wall of said one section, a fastener on the outer surface of the inner wall of said one section, fastening means provided on said flap engageable with said fastener to close the compartments in said one section, closure means for said other section comprising a pair of rows of intermeshing slide fastener teeth attached to the inner longitudinally extending edges of the intermediate and inner walls of said other section, and a slide for operating said slide fastener teeth from the outside of the billfold to provide access to the interior of said other section without opening said one section, outer wall of said one section having free edges forming with the corresponding intermediate wall an opening therebetween to permit a belt to be inserted through said opening between the intermediate and outer walls thereof.

2. A billfold defined in claim 1 wherein one of said sections has a height greater than the other section.

3. A billfold defined in claim 1 wherein the end edges of the outer wall of said other section are relieved.

4. A billfold defined in claim 1 wherein all of said compartments are provided with a permanent liner.

References Cited in the file of this patent

UNITED STATES PATENTS

| | | |
|---|---|---|
| 964,620 | Dana | July 19, 1910 |
| 1,109,846 | Knap | Sept. 8, 1914 |
| 1,558,213 | Atkins | Oct. 20, 1925 |
| 1,651,921 | Felz | Dec. 6, 1927 |
| 1,679,606 | Graves | Aug. 7, 1928 |
| 2,344,694 | Gardner | Mar. 21, 1944 |
| 2,392,533 | Isaac | Jan. 8, 1946 |
| 2,533,850 | Syracuse | Dec. 12, 1950 |
| 2,681,677 | Poeltl | June 22, 1954 |
| 2,718,911 | Solomon | Sept. 27, 1955 |
| 2,767,756 | Niles | Oct. 23, 1956 |
| 3,000,417 | Goldstein | Sept. 19, 1961 |

FOREIGN PATENTS

| | | |
|---|---|---|
| 199,846 | Great Britain | July 5, 1923 |
| 354,464 | Great Britain | Aug. 13, 1931 |